United States Patent [19]
Spencer et al.

[11] Patent Number: 6,042,278
[45] Date of Patent: Mar. 28, 2000

[54] COMPUTER PRINTER DEMONSTRATION APPARATUS

[75] Inventors: Ron A. Spencer; David L. Harlan, both of Portland, Oreg.

[73] Assignee: Hewlett-Packard Company, Palo Alto, Calif.

[21] Appl. No.: 09/066,626

[22] Filed: Apr. 24, 1998

[51] Int. Cl.[7] ........................................................ B41J 3/00
[52] U.S. Cl. ................................................ 400/61; 400/70
[58] Field of Search ........................ 400/61, 70; 395/750

[56] References Cited

U.S. PATENT DOCUMENTS

| | | | |
|---|---|---|---|
| 5,447,378 | 9/1995 | Otsuka et al. ............................. | 400/61 |
| 5,550,985 | 8/1996 | Miller et al. ............................. | 395/750 |
| 5,561,528 | 10/1996 | Johnson et al. .......................... | 358/296 |

*Primary Examiner*—John S. Hilten

[57] ABSTRACT

An apparatus for demonstrating printers is provided. Associated with each printer is a demo control box having at least one button that may be pressed to initiate the printing of a demonstration page by that printer. Each demo control box for each printer is connected to a printer control that contains a set of demo images stored in memory. The printer control receives signals from each of the demo control boxes and selects a demo image from the set of demo images to send to the printers which are connected to printer control outputs. Multiple printers can be printing demo pages at the same time. The controller has a download input for updating the set of demo images to reflect changes in the printers and to provide customized demo pages for the retailer.

11 Claims, 4 Drawing Sheets

COMPUTER PRINTER DEMONSTRATION APPARATUS

BACKGROUND OF THE INVENTION

This invention relates generally to printers and in particular to an apparatus for generating demonstration images for printers.

Printers for personal computers such as the Hewlett-Packard LaserJet® and DeskJet® printer lines are often sold in retail stores. Consumers who come to the retail stores to purchase a printer often desire to operate and compare the various printers on display in order to make a purchase decision. It is desirable that some means be readily available to either the customer or salesperson to demonstrate and compare the various printers by printing demonstration pages from each printer. Demonstration pages ("demo pages") are typically stored as demo images in digital memory that may reside either within the printer or external to the printer and provided via an interface port such as a parallel printer port. The demo image is provided to the printer that in turn prints a demo page.

Providing a dedicated personal computer for each printer or even for a sales aisle of printers to provide demo images is cost prohibitive. Furthermore, the complexity and time required to administrate the printing of demo pages from the various printers interferes with the sales process because the personal computer is configured to print to one printer at a time and must be reconfigured for each type of printer. The technique of using a personal computer to provide the demo pages thus suffers from poor reliability because of the constantly changing configuration of printers on the sales aisle.

Many printers are provided with an internal demonstration mode in which the demo images are stored in internal memory. The internal demonstration mode is typically initiated by a sequence of key presses on the front panel of the printer. This technique suffers from the large amount of dedicated memory typically required to digitally store demo pages, which may exceed the size of the regular memory used for normal printing operations. Because printing demo pages is seldom necessary after the computer printer has been purchased and is in normal use, the memory space that is dedicated to storing the demo images is wasted and adds unnecessarily to the printer's manufacturing cost.

Alternatively, a special demonstration memory, typically called a "demo ROM" (read only memory), could be installed inside the printer to facilitate the sales process. After the sale of the printer, the demo ROM may be re-used in another printer. However, the demo ROM cannot be updated, may be difficult to install in the printer, is easily lost, and is specific to a certain model of printer. The utility of the demo ROM in the sales process is thus limited.

A device for demonstrating printers is discussed in U.S. Pat. No. 5,550,985, "SPECIAL PURPOSE COMPUTER FOR DEMONSTRATING PERIPHERAL DEVICES SUCH AS PRINTERS IN WHICH POWER IS WITHDRAWN FROM THE PORT CONNECTION OF THE PERIPHERAL DEVICE", issued Aug. 27, 1996, to Miller et al. and assigned to Hewlett-Packard Company. The special purpose computer provides demo images for the printer when a button on the demo control box is pressed. No external power connections are needed since the special purpose computer is adapted to draw power directly from the printer's parallel port. The special purpose computer resides in demo control box located adjacent to the printer.

While being substantially easier to install and administrate than a demo ROM, the special purpose computer taught by Miller et al. suffers from many of the same shortcomings of the demo ROM, including the difficulty in updating or customizing the demo images. As new models of printers are introduced into the marketplace, the printer manufacturer must re-design and build new special purpose computers to support the sales programs for the new models. Therefore, it would be desirable to provide a printer demonstration apparatus having a download input that allows for updating demo images to accommodate new models of printers.

SUMMARY OF THE INVENTION

In accordance with the present invention, an apparatus for demonstrating printers is provided. Associated with each printer is a demo control box having at least one button that may be pressed to initiate the printing of a demo page by that printer. Each demo control box is connected to a printer control that contains a set of demo images stored in memory. Within the printer control, a controller receives signals from each of the demo control boxes and selects a demo image from the set of demo images to send to one of the printers which are connected to printer control outputs.

Each of the demo control boxes generally has more than one button for generating more than one type of demo page. For example, it is desirable that demo pages be generated to show various types of text, graphics, and images which are indicated with words or pictures placed on each demo control box. Demo pages may be tailored to a particular model of printer, depending on its capabilities, in a manner that highlights the features of that printer while allowing for meaningful comparisons with other models of printers. The controller thus selects a demo image from the set of demo images to one of the printers based on the particular button of the demo control box that is pressed.

The controller has a download input that may be connected to a personal computer either locally, such as in the retail store, or remotely, such as to a server via the Internet. Via the download input, new demo images may be downloaded and stored in the set of demo images quickly and easily. In this way, as new models of printers are introduced, a new set of demo images may be readily downloaded and stored in the memory in the printer demonstration apparatus as an update. Furthermore, the set of demo images may be readily customized for a particular retail store or a particular sales promotion. For example, demo images containing the retail store logo and contact information as well as sales and pricing information could be updated and downloaded to the printer demonstration apparatus.

It is desirable that the demo pages can be printed independently from one another among the various printers, both to speed up the demonstration process and to facilitate comparison of relative print speed, as measured in pages per minute. A set of printer drivers, one for each printer, are employed to supervise the printing of the demo page that was selected for that printer. Each of the printer drivers operate independently from one another, allowing for multiple printers to be printing demo pages at the same time.

One feature of the present invention is to provide a printer demonstration apparatus.

Another feature of the present invention is to provide a printer demonstration apparatus with a download input for updating demo images.

A further feature of the present invention is to provide a printer demonstration apparatus for demonstrating at least two printers at the same time.

An additional feature of the present invention is to provide a method of demonstrating printers by downloading demo images to a printer controller.

Other features, attainments, and advantages will become apparent to those skilled in the art upon a reading of the following description when taken in conjunction with the accompanying drawings.

DETAILED DESCRIPTION OF THE INVENTION

Figure 1:
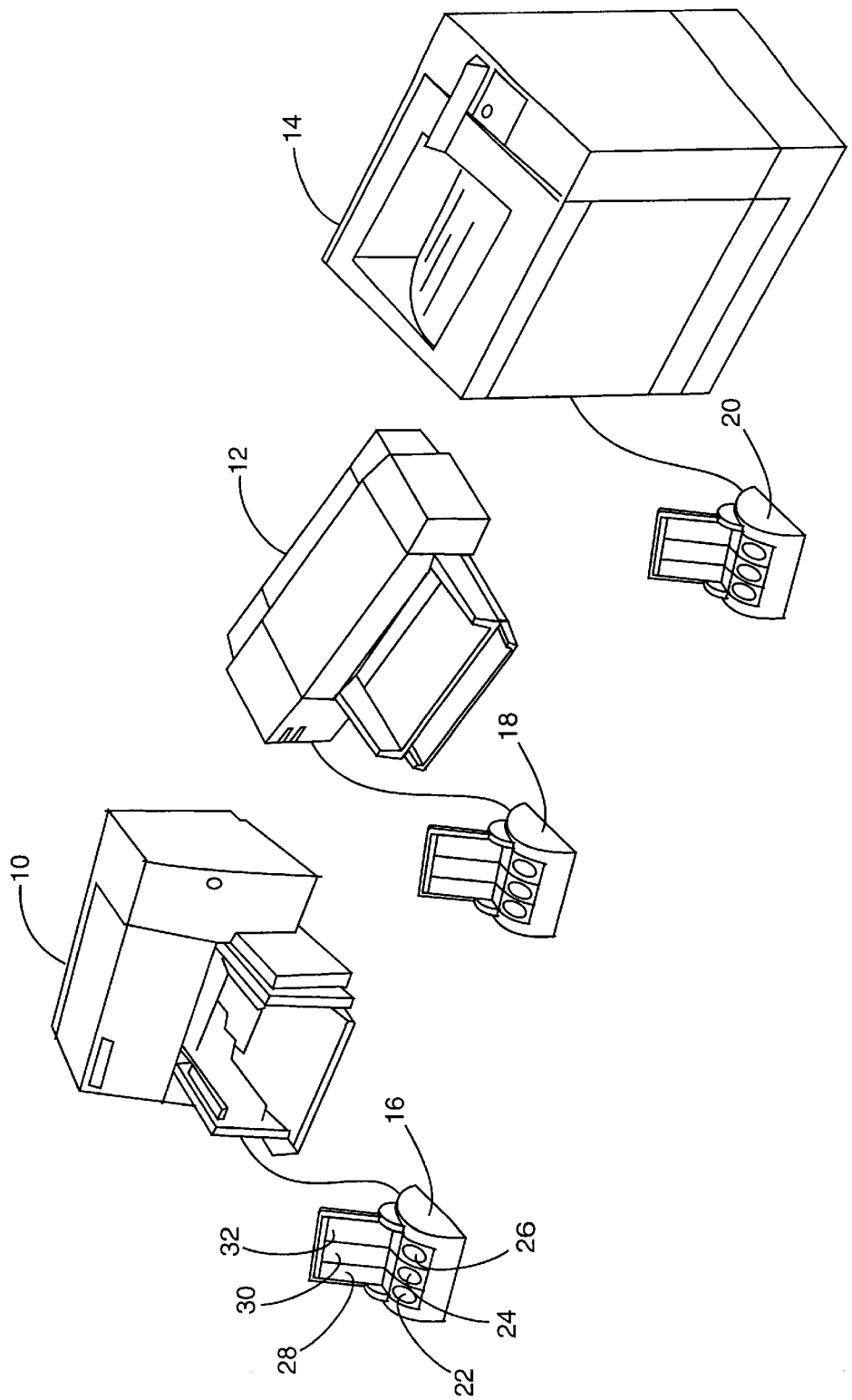
FIG. 1 is an illustration (not to scale) of a set of printers and associated demo control boxes as may be typically found in a retail store.

In FIG. 1 there is shown an illustration (not to scale) of printers 10, 12, and 14 and demo control boxes 16, 18 and 20 as may be found in a typical sales aisle in a retail store. The printers 10, 12, and 14 are typically different models with different features and capabilities. The number and type of printers that may be found in this sales aisle may vary from day to day in the typical retail environment. To facilitate the comparison of the printers 10, 12, and 14 by a customer who is making a purchase decision, the demo control boxes 16, 18, and 20 are provided.

The demo control box 16 is associated with the printer 10 and has a set of buttons 22–26 that may be pressed in order to obtain demo pages from the printer 10. Associated with the set of buttons 22–26 are a set of labels 28–32 that visually illustrate the different demo pages that may be obtained. Examples of demo pages may include black and white text, black and white text combined with color graphics, and color photographic images. The demo control box 18 associated with the printer 12 and the demo control box 20 associated with the printer 14 operate in a similar manner to that of demo control box 16. It is desirable that the demo control boxes 16, 18 and 20 appear to operate independently from one another so that demo pages can be printed at the same time from the printers 10, 12 and 14.

Figure 2:
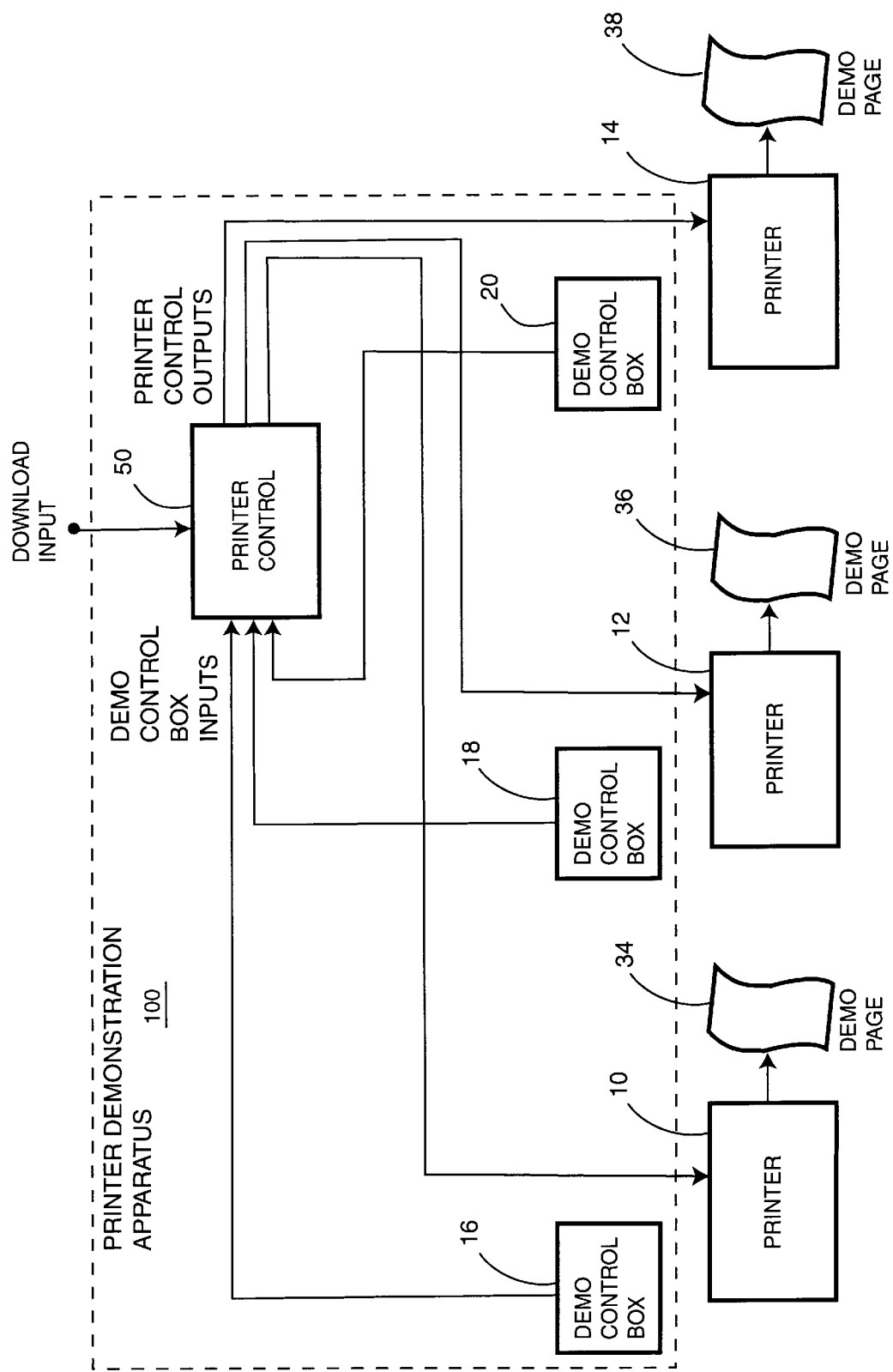
FIG. 2 is a block diagram of a printer demonstration apparatus according to the present invention.

FIG. 2 is a block diagram of a printer demonstration apparatus 100 according to the present invention. A printer control 50 has a set of demo control box inputs for receiving signals from the demo control boxes 16, 18, and 20. The printer control 50 may be readily adapted to receive signals from as few as one demo control box or as many demo control boxes as needed for the application.

The printer control 50 has a download input for receiving control and download information that can be used to update demo images that are presented to each printer. The download input may be connected to a local computer in the retail store as needed to update the demo images. Alternatively, the input may be coupled to a remote computer or server via a local area network (LAN) or Internet link according to known techniques for remote data access so that the process of downloading demo images may be done centrally.

The printer control 50 has a set of printer control outputs a–c which are connected to the printers 10, 12 and 14. The set of printer control outputs may be connected to as few as one printer or as many printers as needed for the application. The printer control 50 provides a selected demo image to one of the printers 10–14 corresponding to the appropriate key that is pressed on one of the demo control boxes 16–20. A demo page 34 from the printer 10, a demo page 36 from the printer 12 or a demo page 38 from the printer 14 may be generated independently from each other in this manner.

Figure 3:
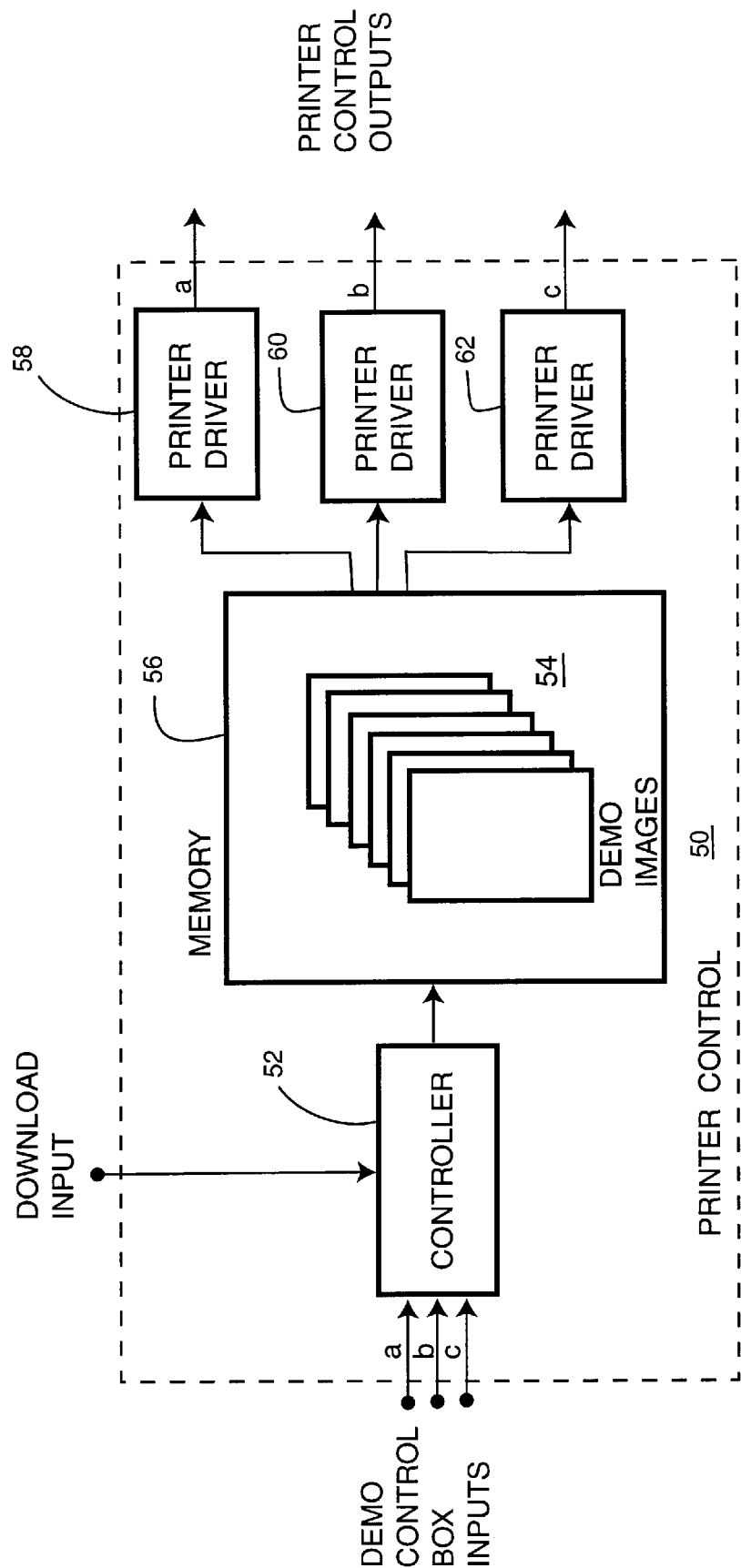
FIG. 3 is a block diagram of a printer control that forms a portion of the printer demonstration apparatus of FIG. 2.

In FIG. 3, there is shown a block diagram of the printer control 50 (shown in FIG. 2). A controller 52 contained within the printer control 50 is connected to the set of demo control box inputs a–c to receive signals from the demo control boxes 16, 18, and 20. The signals contain information about which of the buttons on the demo control box were pressed. The controller 52 then operates to map the particular button and demo control box to select a selected demo image from a set of demo images 54 which is contained in a memory 56. The selected demo image is then provided to one of a set of printer drivers 58–62.

Each of printer drivers 58–62 has an output that is adapted for coupling to one of the printers 10–14, typically as a parallel printer port according to industry standards. The outputs of the printer drivers 58–62 collectively form the set of printer control outputs a–c which correspond to the set of demo control box inputs a–c. The printer drivers 58–62 may be implemented in hardware or software and operate as a buffer and supervisor to facilitate the transfer of the selected demo image to the printer at a speed required by that particular printer. The printer drivers 58–62 operate independently of one another to provide the selected demo image at the same time to multiple printers, allowing these multiple printers to be printing demo pages at the same time. As few as one printer driver or as many printer drivers as needed may be added to the printer demonstration apparatus 100 to implement the present invention.

The controller 52 is connected to the download input for receiving updated demo images from an external source such as a personal computer or remote server. The download input may be implemented using a number of communications protocols known in the computer industry. For example, the download input may be implemented using an RS-232 serial port, a Universal Serial Bus (USB) port, or an Ethernet (10BASE-T) port on a LAN. The demo images downloaded via the download input are directed by the controller 52 to be received and stored by the memory 56.

Figure 4:
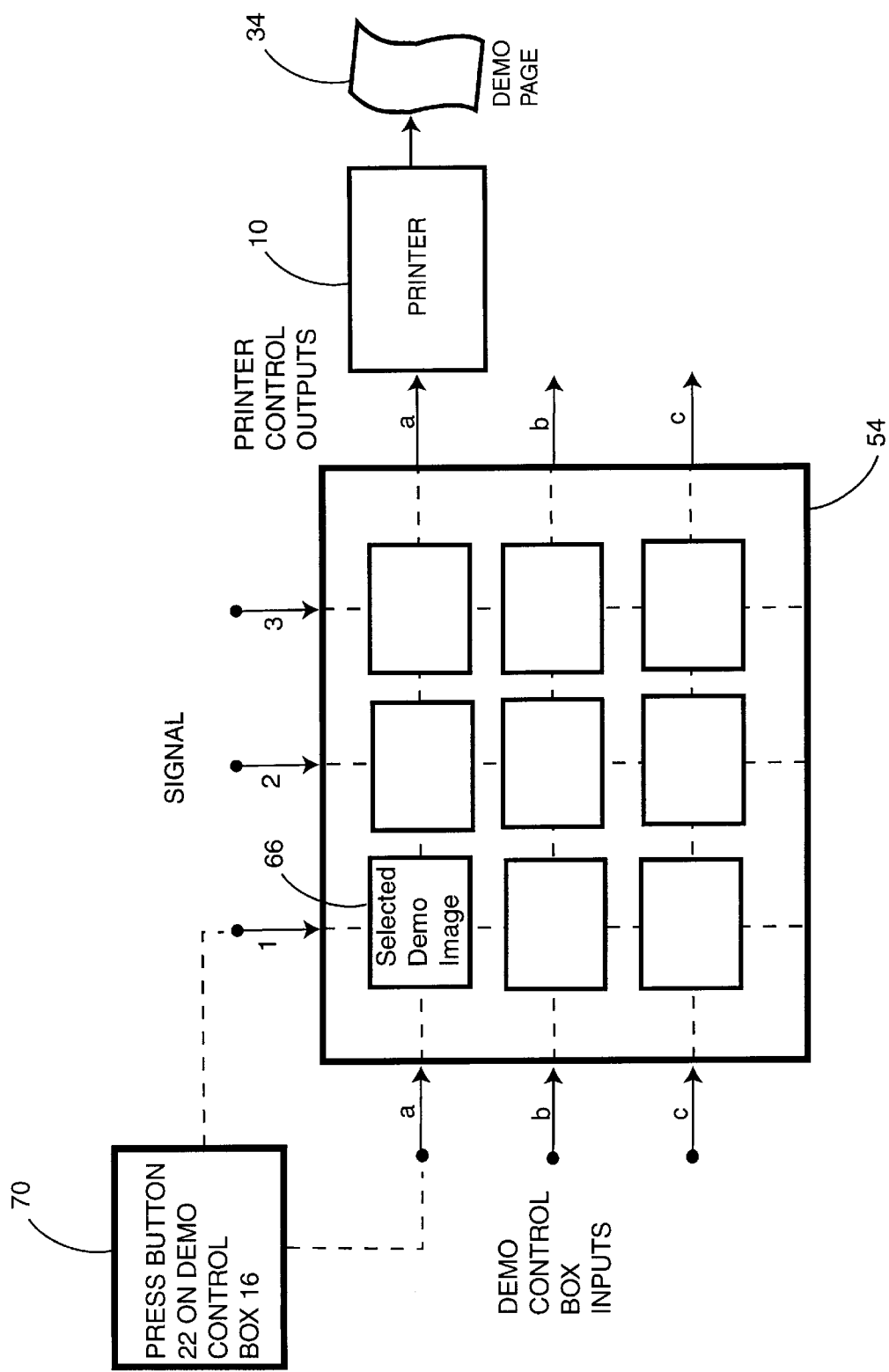
FIG. 4 is a matrix showing a mapping of demo images within the printer control shown in FIG. 3.

In FIG. 4, there is shown a diagram illustrating a selection process for providing demo images to printers. The set of demo images 54 has been downloaded via the download input and stored in the memory 56. The set of demo images 54 may be stored in a number of ways. As shown, the set of demo images 54 is stored in a matrix fashion, with rows corresponding to related demo control box inputs and printer control outputs. Columns correspond to the signals received from the demo control boxes, with signals '1', '2', and '3' corresponding to the three buttons on the demo control boxes. The signals may be digital or analog. Pressing one of the buttons on one of the demo control boxes will generate a signal at the demo control box input of the printer control 50.

The following example illustrates the process relating a key press on one of the demo control boxes to the printing of the demo page 34 according to the present invention. In the process 70 labeled PRESS BUTTON 22 ON DEMO CONTROL BOX 16, the button 22 of the demo control box 16 (shown in FIG. 1) is pressed. The demo control box 16 is connected to demo control box input 'a' of the printer control 50. Pressing the button 22 generates the signal '1'. According to the matrix for row 'a' and button '1', the selected demo image 66 would then be selected and provided at the printer control output 'a' to the printer 10 which prints out the selected demo image 66 on the demo page 34. Each of the printer control outputs may operate independently, allowing multiple printers to print out demo pages at the same time.

Updating the set of demo images 54 requires knowledge of which printer is connected to which printer control output so that an appropriate row of demo images may be generated for each demo control box 16–20 which is associated with the printers 12–14. The types of demo pages to be generated, such as black and white text or color photographic images, could then be determined for each of the buttons. To facilitate comparison between different printers, the types of demo images along each column could be made to roughly correspond to each other while allowing the differences between the various printers to be given the desired amount of emphasis.

For example, the leftmost button on each of the demo control boxes 16–20 may correspond with demo pages for black and white text which may be compared between the printers 10–14.

Updating the set of demo images 54 may be done for different reasons. For example, updating may be performed to reflect new models of printers as they are introduced. Equally as important, updating may be performed to delete demo images for printers that are no longer in the store display, either because the model was discontinued or because the printer is temporarily out of stock. As printers are added or deleted from the store display, the process of downloading and updating the set of demo images 54 may be done as often as needed.

The set of demo images 54 may also be updated with customized demo images for the local retailer. Customized demo images could be created that include the brand name and store logo of the. Customized demo images that include sales promotions could also be created and easily downloaded to the printer demonstration apparatus 100. Because the downloading process is relatively fast, a dedicated personal computer would not be required.

It will be obvious to those having ordinary skill in the art that many changes may be made in the details of the above-described preferred embodiments of the invention without departing from the spirit of the invention in its broader aspects. For example, the numbers and types of demo images may be readily adapted to other peripherals such as video displays, scanners, copiers, and plotters. The printer demonstration apparatus 100 may be readily expanded to accommodate many different types and numbers of computer peripherals while retaining the advantages of versatility and low cost. The selected demo image may be selected according to ways of mapping other than the matrix structure as long as the association between the demo control box and the printer is preserved. Therefore, the scope of the present invention should be determined by the following claims.

What we claim as our invention is:

1. A printer demonstration apparatus, comprising:
   (a) a printer control having at least one demo control box input, at least one printer control output for coupling to a printer, and a download input for receiving a set of demo images; and
   (b) a demo control box coupled to said demo control input and having at least one button wherein said printer control selects a selected demo image from said set of demo images responsive to said button and provides said selected demo image to said printer control output.

2. A printer demonstration apparatus according to claim 1, said printer control comprising:
   (a) a controller coupled to receive signals from said demo box control input and said set of demo images from said download input;
   (b) a memory coupled to said controller to receive and store said set of demo images; and
   (c) at least one printer driver interposed between said memory and said printer control output.

3. A printer demonstration apparatus according to claim 1 further comprising:
   a plurality of demo control box inputs;
   a plurality of demo control boxes coupled to said demo control box inputs, each of said plurality of demo control boxes having at least one of said buttons; and
   a plurality of printer control outputs for coupling to printers;
   wherein said printer control selects said selected demo image from said set of demo images to said printer control output responsive to said button for each of said plurality of demo control boxes.

4. A printer demonstration apparatus according to claim 3 wherein each of said plurality of demo control boxes has a plurality of said buttons.

5. A printer demonstration apparatus, comprising:
   (a) a printer control having a plurality of demo control box inputs, a plurality of printer control outputs, and a download input for receiving a set of demo images;
   (b) a plurality of demo control boxes coupled to said demo control box inputs, each of said plurality of demo control boxes having at least one button;
   (c) a plurality of printer control outputs for coupling to printers;
   wherein said printer control selects selected demo images from said set of demo images and provides said selected demo images to said printer control outputs responsive to said button of said demo control boxes.

6. A printer demonstration apparatus according to claim 5, said printer control comprising:
   (a) a controller coupled to receive signals from said plurality of demo box control inputs and said set of demo images from said download input;
   (b) a memory coupled to said controller to receive said set of demo images; and
   (c) a plurality of printer drivers interposed between said memory and each of said printer control outputs.

7. A printer demonstration apparatus according to claim 5 wherein each of said plurality of demo control boxes has a plurality of buttons.

8. A method for demonstrating printers, comprising:
   (a) downloading a set of demo images to a printer controller;
   (b) providing a plurality of demo control boxes coupled to said printer controller, each of said demo control boxes being associated with one of said printers and having at least one button;
   (c) pressing said button on one of said demo control boxes to provide a signal to said printer controller;
   (d) selecting a selected demo image from said set of demo images responsive to said button; and
   (e) providing said selected demo image to said one of said printers to obtain a demo page.

9. A method for demonstrating printers according to claim 8 further comprising updating said set of demo images to reflect new models of printers.

10. A method for demonstrating printers according to claim 8 further comprising updating said set of demo images to be customized for a local retailer.

11. A method for demonstrating printers according to claim 8 further comprising providing said selected demo image to a plurality of said printers at the same time.

* * * * *